United States Patent [19]
Yamaguchi et al.

[11] Patent Number: 5,675,569
[45] Date of Patent: Oct. 7, 1997

[54] READBACK CIRCUIT FOR AN OPTICAL INFORMATION READING AND RECORDING APPARATUS

[75] Inventors: Takeshi Yamaguchi, Sakai; Tsuneo Fujiwara, Nara; Hiroshige Hirajima, Tenri, all of Japan

[73] Assignee: Sharp Kabushiki Kaisha, Osaka, Japan

[21] Appl. No.: 567,429

[22] Filed: Dec. 5, 1995

[30] Foreign Application Priority Data

Dec. 16, 1994 [JP] Japan .................. 6-313811

[51] Int. Cl.⁶ .................................................. G11B 7/00
[52] U.S. Cl. .................. 369/124; 369/59; 360/51; 371/30; 371/43; 371/55; 341/107; 341/59; 341/94
[58] Field of Search .................. 369/124, 59, 60, 369/47, 50, 44.25, 54; 360/32, 46, 51; 371/30, 43, 55; 341/107, 59, 94

[56] References Cited

U.S. PATENT DOCUMENTS

| | | | |
|---|---|---|---|
| 5,357,524 | 10/1994 | Shimpuku et al. | 371/30 |
| 5,377,054 | 12/1994 | Yamaguchi et al. | 369/59 |
| 5,455,813 | 10/1995 | Hayashi | 369/59 |
| 5,469,415 | 11/1995 | Fujita et al. | 369/59 |
| 5,506,827 | 4/1996 | Tobita | 369/59 |
| 5,517,476 | 5/1996 | Hayashi | 369/59 |

FOREIGN PATENT DOCUMENTS

| | | |
|---|---|---|
| 3-166839 | 7/1991 | Japan . |
| 4-162262 | 6/1992 | Japan . |

OTHER PUBLICATIONS

Ogami et al, "Optical Disc Technique", Radio–Gijutsusha, Feb. 10, 1989, pp. 188–191.

Kitahara et al, "Performance of Viterbi Decording System for 1,7 Code in Magneto–Optical Recording", Report No. C–472 of Japan Electronical Information and Communication Institute in 1993 Spring Meeting, pp. 5–102.

"New Detector for 1,k Codes Equalized to Class II Partial Response" (Roger Wood, IEEE Transactions on Magnetics, vol. 25, No. 5, Sep. 1989, pp. 4075–4080).

"Partial Response Signaling" (Peter Kabal et al. IEEE Transactions on Communications, vol. Com–23, No. 9, Sep. 1975, pp. 921–934).

"Viterbi Detection of Class VI Partial Response on a Magnetic Recording Channel" (Roger W. Wood et al. IEEE Transactions on Communications, vol. Com–34, No. 5, May 1986, pp. 454–461).

*Primary Examiner*—Loha Ben
*Attorney, Agent, or Firm*—Nixon & Vanderhye P.C.

[57] ABSTRACT

A recorded signal reproduction circuit in an optical disc information reading and recording apparatus converts a recorded signal recovered from an optical disc to PR (1, 2, 1) characteristics through a equalizer circuit, digitizes it through an A/D converter and at the same time also generates a clock signal synchronized in phase with the equalizer circuit output signal by using a binary edcoder circuit and a PLL circuit. This clock signal is then provided to an A/D converter as the sampling clock. The A/D converter output signal is then decoded to the original channel bit stream based on the clock signal. Because the equalizer circuit output signal is provided to both the binary encoder/PLL circuit and the A/D converter together, additional circuitry for converting signals into a binary series of pulses is unnecessary and reduction of circuit scale is possible. Moreover, in case of a change-over in the frequency characteristics of the equalizer circuit, due to a change in recording and reproduction frequency, the change-over will not affect the phase relationship between an input signal to the A/D converter and a sampling clock. In addition, it becomes simple to adjust this phase relation.

14 Claims, 7 Drawing Sheets

READBACK CIRCUIT FOR AN OPTICAL INFORMATION READING AND RECORDING APPARATUS

FIELD OF THE INVENTION

The present invention relates to readback (i.e., playback) circuits for an optical information reading and recording apparatus, and more specifically, to a method and an apparatus for the recovery of digital information recorded along tracks of an optical disc recording medium and a readback circuit for detecting and accurately extracting digital information from the optical readback signal.

BACKGROUND AND SUMMARY OF THE INVENTION

Conventional optical disc reading and recording devices (i.e., information recording and reproduction apparatus that optically reproduces or records digital information along tracks on an optical disc recording medium or the like often employ various signal conditioning methods that enable high density recording for increasing the recording capacity of the disc.

In one such signal conditioning arrangement, a digital data readback (detecting) circuit processes the reproduced signal acording to a "Partial Response Maximum Likelihood" (PRML) equalization scheme and then decodes it using Viterbi decoding. This approach is discussed in an article by Kitahara et al. entitled "Examination on effectiveness for magneto-optic recording by coding", Spring Session of Electronic Information Communication Association, 1993. In the method described therein, data bit streams are recorded on a magneto-optic disc after being equalized using (1, 7) RLL (run length limited), and upon readback, recorded signals obtained from an optical read head are waveform equalized using PR (1, 1) equalization and then Viterbi decoding is carried out.

Another signal treating method using Viterbi decoding is disclosed in Laid-open Japanese Patent Application No. 7-122000. In this method, a data bit stream is encoded using schemes, such as (1, 7) RLL or (2, 7) RLL, etc., in which minimum reverse interval is more than two channel bits, and recorded on magneto-optic discs. On playback, recorded signals obtained from a magneto-optic pickup head are equalized in waveform to PR(1, 2, 1) characteristics and then Viterbi decoding is carried out.

With respect to recorded digital signal reproduction circuits that use PRML detection as contemplated in accordance with the present invention, there are various possible constructions. As such, one preferred signal conditioning arrangement is explained in greater detail hereunder as an example.

More specifically, recorded signals reproduced by an optical pickup are input to an amplifier through an AC coupling means, such as a capacitor, and surplus high frequency band energy is cut by a low pass filter. Gain of the signal is constrained by an automatic gain control (AGC) circuit. Output of AGC circuit is provided both to an equalizer circuit for equalizing to partial response characteristics and to a clock extraction circuit for producing a sampling clock for A/D conversion (described later). The reproduced signal, equalized by the equalizer circuit, is converted by an A/D converted to a digital value based on a clock signal obtained from the clock extraction circuit, and then decoded using a "maximum-likelihood" scheme by a Viterbi decoder. In the present example, the clock extraction circuit uses a PLL circuit.

The signal conditioning arrangement and method in accordnce with the present invention is not limited by any particular clock extraction method, although it is conventional to use a binary coded digital (BCD) signal converted from the reproduced recorded signal. Further details of such treatment of reproduced signals are explained in the first chapter, pages 189–212, of "OPTICAL DISC TECHNIQUE", edited by Morio Ogami, published by Radio Technique Co. A construction of the recorded digital signal reproduction conditioning arrangement as described in the above mentioned book utilizes an amplifier for amplifying the recorded signal, obtained from an optical disc, a waveform equalizer circuit to reduce waveform interference, a wave shaping circuit for shaping the above output and a phase-locked-loop (PLL) circuit for generating clock signals synchronized with a fundamental period of the signal.

Laid-open Japanese Patent Application No. 3-166839 discloses an equalizer circuit that equalizes a digital information signal so as to diminish interference between codes. Equalized signals are then equalized again to the partial response characteristics by a digital filter after being converted to digital values by an A/D converter. The output of the equalizer circuit is converted into a binary series of pulses and used for clock signal generation.

A readback circuit disclosed in Laid-open Japanese Patent Application No. 7-122000 is also provided with an equalizing circuit to equalize reproduction signal to partial response characteristics. In this example, the output signal of the equalizer circuit allows a predetermined particular interference between codes. According to the "OPTICAL DISC TECHNIQUE", it is general to treat a waveform to reduce the waveform interference during the binary coding of a clock extracting circuit. However, a separate equalizer circuit is required, and this results in increase in circuit scale.

A ZCAV system is one of the reading and recording systems and for the case Where this ZCAV system is combined wherein the disc is rotated at a constant rotation number and the recording and readback are carried out by changing a record clock (a record frequency) in accordance with the distance from the disc center, it is necessary to change frequency characteristics of both the first equalizer circuit used for equalizing the readback signal to partial response characteristics and the second equalizer circuit used with the clock extracting circuit, in a maner corresponding to the recording frequency changes. However, changing the frequency characteristics of an equalizer circuit results not only in a change in the gain characteristics but also in the delay characteristics of the equalizer circuit. Therefore, in this case, a problem arises in that the phase relation between a signal into the A/D converter through the first equalizer circuit and a clock signal( i.e., a clock signal to the A/D converter—which the PLL circuit generates based on signals converted into a binary series of pulses through the second equalizer circuit) changes depending on the delay characteristics of both the first and the second equalizer circuits.

According to a technique disclosed in Laid Open Japanese Patent Application No. 3-166839, readback signals, which are converted to digital values by an A/D converter after being equalized, are equalized again by a digital filter. This procedure requires providing an equalizer circuit and a digital filter, which also increases the size of the overall readback circuit.

Furthermore, in existing readback circuits, the readback signal lacks signal components in low frequency band because the readback signals are input into the next circuit through AC coupling. Moreover, in the readback circuit, low frequency beats (i.e., low frequency offsets) of the readback signal caused by variation in disc reflection rate remains unremovable after AC coupling. In addition, there is a problem when using the PRML method that during data detection, these low frequency offsets prevent a correct detection of the signal level at the A/D converter which results in producing Viterbi decoding errors.

SUMMARY OF THE INVENTION

One object of this invention is to provide a digital information readback (playback) circuit of reduced scale and size for an optical information recording and reproduction apparatus. Another object of this invention is to provide a readback circuit for an optical information recording and reproduction apparatus that is able to cancel any undesirable low frequency offset.

To attain these objects, a first readback circuit for an optical information recording and reproduction apparatus in accordance with the present invention comprises the following:

an equalizer circuit to transform signals reproduced from the recording medium (i.e., readback signals) to a partial response waveform having, for example, PR (1, 2, 1) characteristics;

a binary encoder circuit to convert the output signal from the equalizer circuit into a series of binary pulses;

a PLL circuit that provides a clocking signal which is synchronized in phase with a series of binary pulses produced by the binary encoder;

an A/D converter to digitize the output signal of the equalizer circuit based on a clock signal; and, a Viterbi decoder to decode the digital values output from the A/D converter in maximum likelihood.

With the arrangement of the first readback circuit, the readback signal, after being equalized to the appropriate partial response characteristic (e.g., PR(1, 2, 1)) by the equalizer circuit, is input to an A/D converter and converted to a digital value for every sampling determined by a clock signal generated from a PLL circuit. The A/D converter output signal is transferred to a Viterbi decoder, where it is decoded using a "maximum likelihood" decoding approach. After being converted to a pulse signal by the binary circuit, equalizer circuit output signal is input to a PLL circuit, where a clock signal, synchronized with the readback signal in phase, is generated.

Using this approach, signals equalized to PR (1, 2, 1) partial response characteristics by the equalizing circuit are provided both to the A/D converter and to the binary encoder circuit to produce a clock signal that is synchronized to the readback signal. Therefore, additional equalizer circuitry for the binary encoder circuit is unnecessary, resulting in a reduction in scale of the overall readback circuitry.

Moreover, if it becomes necessary to change the equalizer circuit frequency response characteristics to accommodate changes in recording and readback frequency, a change-over of the equalizer frequency characteristics will not affect the phase relationship between an equalized readback signal and the clock signal from the PLL circuit. Thus, it becomes easy to adjust the phase relationship.

In accordance with a preferred embodiment of the present invention, an example binary encoder circuit comprises the following:

a high frequency band emphasis circuit to increase gain in the high frequency band of the equalizer circuit output, an envelope detecting circuit to detect the positive and negative envelope limits of the high frequency band emphasis circuit output signal, a middle-value (i.e., median) determination circuit which functions to provide a signal that is mid-way between the detected positive and negative limits of the equalized signal envelope, and a comparator to compare the output signal of the equalizer circuit with the middle value signal.

In addition, the preferred embodiment includes a correction circuit for amending the equalizer circuit output signal based on the determined median (middle) level.

Using the above described arrangement, a readback signal equalized to PR (1, 2, 1) characteristics by the equalizer circuit, has its high frequency signals emphasized by the high bandpass emphasis circuit while being maitained at a uniform (peak) amplitude level over its entire band width.

After being converted to signals representing the median value betwen the upper and lower (i.e., positive and negative) envelope edges by positive and negative envelope detecting circuits and the middle-value determination circuit, the signal is provided to a comparator as a threshold value. A series of binary pulses is then obtained through comparison of the equalizer circuit output with this threshold value by the comparator. In addition, the equalizer circuit output signal is also digitized by an A/D converter after any low frequency offset of the equalizer circuit output signal is removed by an offset correction circuit that bases the applied correction on the median envelope value.

Through the above mentioned approach, signal components in the low frequency band, which are often lost through AC coupling of the readback signal, are compensated. Moreover, low-band noise components, which arise by virtue of variation in disc to disc reflection properties and remain despite AC coupling, are also removed. Accordingly, decoding error in the Viterbi decoder are less apt to arise when using the improved approach of the present invention.

In attaining the above mentioned objects of the invention, a second readback circuit in an optical information recording and reproducing apparatus in accordance with the present invention comprises the following:

an equalizer circuit for converting a readback signal from a recording medium, wherein data are recorded so as to have a minimum reverse interval of not less than two channel bits, to a partial response characteristic waveform, for example, PR (1, 2,1);

a high pass filter (HPF) to cut out the low frequency band signals from the equalizer circuit output;

a signal summing node (i.e., summing the HPF output with a feedback signal);

a comparator to compare the summed signal with a predetermined threshold value;

a low pass filter, coupled to the output of the comparator, to output a signal to be summed by the signal summing node by cutting out the high frequency band signals of the output of the comparator;

a PLL circuit that provides a clocking signal which is synchronized in phase with the output pulse stream of the comparator;

an A/D converter to digitize an output signal of the summed node in response to the clocking signal produced by the PLL; and a Viterbi decoder to decode binary value output from the A/D converter in maximum likelihood.

With the arrangement of the second readback circuit, a readback signal, after being converted to its PR (1, 2, 1) characteristics by an equalizer circuit, is rid of low band noise components a rising from variations in disc reflection by a high pass filter. After being summed with a feedback signal it is converted into series of binary pulses by comparison with a predetermined threshold value level using a comparator. After being rid of high frequency band by a low pass filter, the comparator output signal is summed with the high pass filter output signal at a feedback summing node. The summed signal is then input to an A/D converter and converted to a digital value for each clocking pulse output from the PLL circuit.

Thus, any low band noise components due to the variations in disc reflection still remain after AC coupling are removed by the high pass filter. Signal components in the low frequency band, which are typically lost because of AC coupling, are compensated by adding the signals which pass the low pass filter. Therefore, any low frequency offset in the equalizer circuit output signal is removed and decoding errors in the Viterbi decoder are less apt to arise.

In addition, signals equalized to PR (1, 2, 1) waveform characteristics by the equalizer circuit are provided to the binary circuit to produce a clock signal, which is synchronized with the readback signal, the data signal from the PLL circuit and the A/D converter. Thus function is same as that of the first readback circuit.

Further objects, special features and excellent points of the present invention will become apparent from the detailed description of the drawings given hereinafter. These and other features and advantages of the present invention will become more completely understood by referring to the following detailed description of presently preferred exemplary embodiments in conjunction with the FIGURES of the accompanying drawings.

DETAILED DESCRIPTION OF THE DRAWINGS

[First embodiment]

The following discussion relates to an example embodiment of a readback circuit in accordnce with the present invention. More specifically, an embodiment of a readback circuit for a magneto-optic disc apparatus, a kind of optical information recording and reproduction apparatus, is described in detail with reference to FIGS. 1 through 10.

Figure 2:
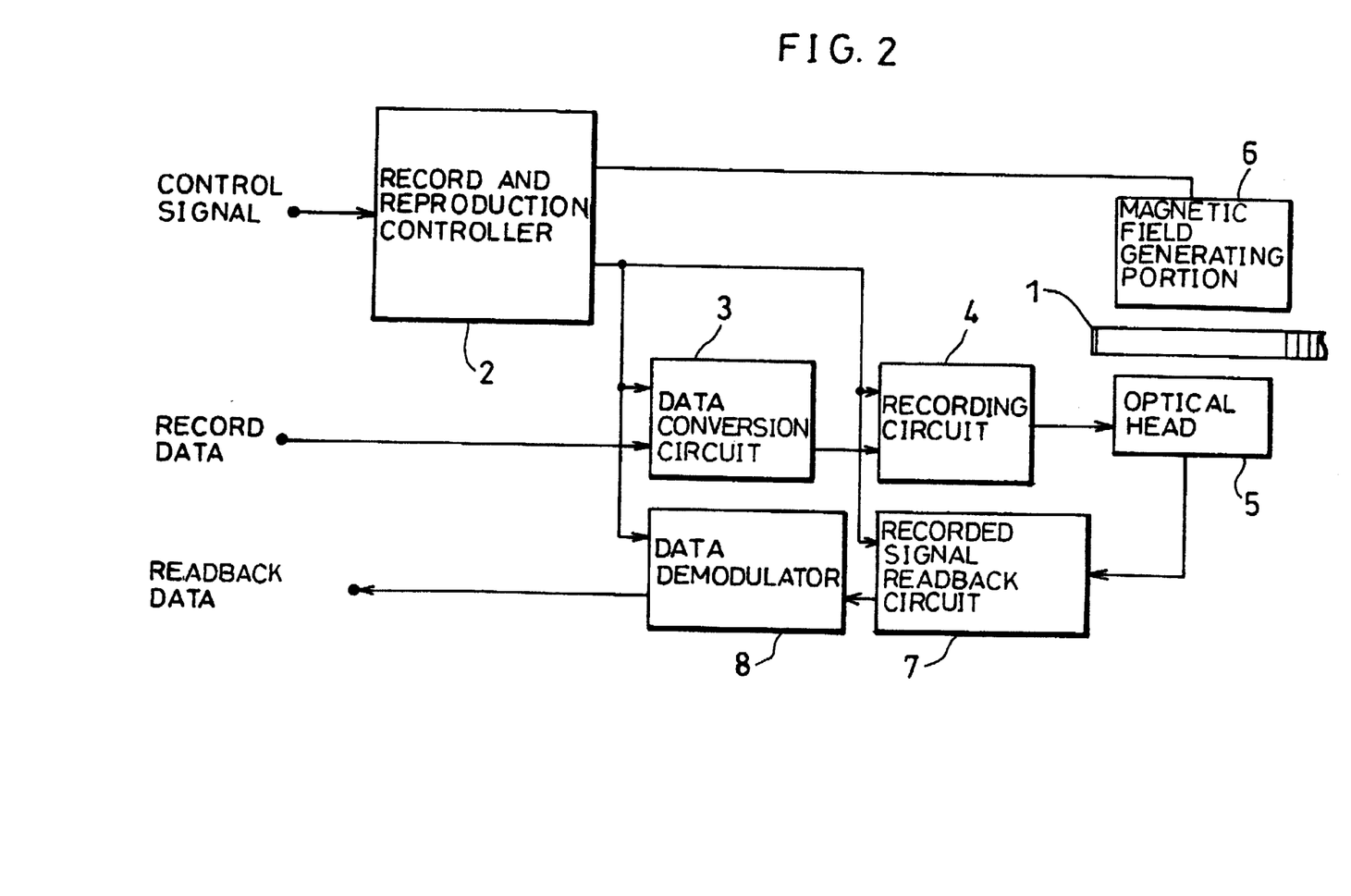
FIG. 2 is a block diagram illustrating the signal procesing circuitry arrangement for a substantial part of an example magneto-optic disc reading and recording apparatus.

The magneto-optical disc apparatus relating to this invention has a magneto-optic disc 1 driven rotatively by a motor (not shown) at a constant angular velocity (CAV) as shown in FIG. 2. A spiral information track, starting from an inner circle is formed on the magneto-optic disc 1. When considering a single rotation of the disc as one track, the disc may be considered as organized into plural tracks which form one zone and plural zones which form the entire user data recording area.

When recording information, a host device (not shown) supplies a control signal to a record and reproduction controller 2 so as to give an instruction of recording operation. At the same time, recorded data are sent to data modulator conversion circuit 3. The data modulator conversion circuit 3 is started by a control signal from the record and reproduction controller 2 and converts recorded data, using, for example, a (1,7) RLL encoding/modulation method. Converted recorded data are then provided to recording circuit 4. The recording circuit 4 produces driving signals to modulate a semiconductor laser output in optical head 5 based on control signals from record and reproduction controller 2 and conversion data from data conversion circuit 3. At the same time, a magnetic field generating portion 6 generates an auxiliary magnetic field necessary for recording in response to a control signal from recording and reprodution controller 2.

As mentioned above, the recording procedure is carried out by irradiating a designated track on magneto-optic disc 1, while under an auxiliary magnetic field, by a high power laser beam responsive to a driving signal from recording circuit 4.

In the present example, a ZCAV recording method adopts that the recording rate is constant in each zone and the recording rate is variable among circumferential zones. It is higher at outer perimeter circumferential zones than inner circumferential zones and line recording density is almost constant from the innermost recording zone to the outermost zone.

The (1,7) RLL conversion method mentioned above converts a data bit stream to a code bit stream according to a predetermined code conversion rule. A "1" in code bit streams corresponds to a reversal or "turn-over" of the recording medium magnetization on magneto-optic disc 1. That is, code bit streams are converted to channel bit codes by employing the conventional NRZI method and then provided to recording circuit 4. In this type of code conversion, a binary number of "0" inserted between code bit "1" and "1" is constrained to be one at its minimum and seven at its maximum. Therefore, the minimum magnetization reversal interval of the recording medium magnetization on a magneto-optic disc is two channel bits and the maximum is eight channel bits.

Upon readback of information, an optical head 5 scans a track, designated by the host rank device, on magneto-optic disc 1, converts light intensity fluctuations, which a read head photodetector (not shown) receives and which corresponds to the "turn-over" (i.e., reversal) state of the recording medium magnetization, to electrical signals and outputs these signals to recorded signal readback circuit 7. The readback circuit 7, controlled by recording and reproduction controller 2, reproduces the original recorded channel bits. Output of readback circuit 7 is input into data demodulator 8. The data demodulator 8 demodulates channel bits from readback circuit 7. Reproduction data demodulated by the data demodulator 8 are output as the signal readback data to the host device.

Readback signals from optical head 5 are superimposed with an offset corresponding to a reflected light quantity determined by a reflection coefficient of magneto-optic disc 1. In addition, low frequency components of the readback signal, depend both on the conversion method used and the bit rate of the recording bits which contains noise components arising from fluctuations in the reflected light (which is influenced by both reflection rate fluctuations along the track of the magneto-optic disc 1 and the scanning speed with which the light beam emitted from the optical head 5 scans the magneto-optic disc).

Figure 1:
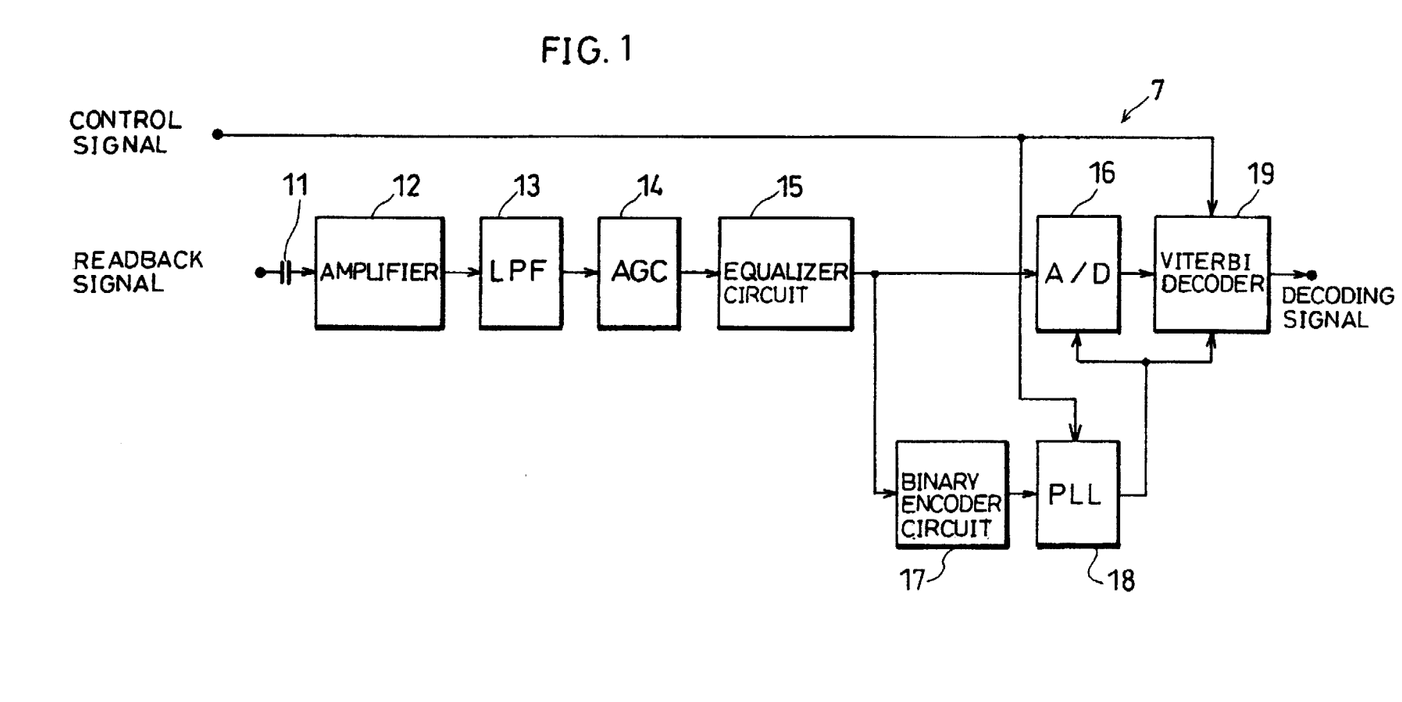
FIG. 1 is a block diagram showing a preferred embodiment of a recorded signal reproduction circuit for use in a magneto-optic disc reading and recording apparatus in accordance with the present invention.

Referring now to FIG. 1, recorded signal readback circuit 7 contains a coupling capacitor 11 (hereinafter referred to as a capacitor), an amplifier 12, a low pass filter 13, an AGC circuit 14, an equalizer circuit 15, an A/D converter 16, a binary encoder circuit 17, a PLL circuit 18 and a Viterbi decoder 19.

Readback signals output from the optical head 5 are AC coupled via capacitor 11 and input to amplifier 12. An AC coupling method via capacitor 11 is adopted because (1) it is difficult for the amplifier 12 to amplify in a wide band range, i.e., upto DC and (2) the foregoing noise components should be eliminated. However, the frequency compoments above the cut-off frequency determined by AC coupling time constant are not eliminated. Besides eliminating DC components from the readback signal, capacitor 11 has the effect of preventing a DC voltage offset.

Amplifier 12 amplifies the AC coupled readback signal to moderate amplitude level. The bandwidth of the output signal of amplifier 12 is limited by low pass filter 13, and after being eliminated of surplus high band frequencies, AGC circuit 14 eliminates amplitude fluctuations resulting from reflection rate fluctuations of magneto-optic disc 1. The output signal of AGC circuit 14 is equalized to a PR(1, 2, 1) waveform by equalizer circuit 15.

The output signal of equalizer circuit 15 is input not only to an eight-bit A/D converter, 16, but to binary encoder circuit 17. The binary encoder circuit 17 correlates an output signal of equalizer circuit 15 and the magnetization direction of magneto-optic recording medium, and generates pulse streams of digital value "1" corresponding to one magnetization direction and "0" corresponding to another magnetization direction. The output signal of binary encoder circuit 17 is then input to phase-locked-loop (PLL) circuit 18. In respect to a control signal from recording and reproducing controller 2, the PLL circuit 18 outputs clock signals in phase to pulse streams output from binary encoder circuit 17. The clock signal so produced has nearly the same frequency as the channel bit rate from the disc.

In response to the clock signal output from PLL circuit 18, A/D converter 16 quantizes the output from the equalizer circuit 15 (using at least eight bits of quantization resolution). The output from A/D converter 16 is then input to Viterbi decoder 19.

In response to a control signal from record and reproduction controller 2, the Viterbi decoder 19 decodes reproduction signals, which are represented by an eight bit digital value output from A/D converter 16, to original disc channel bit streams under the timing of the clock signal output from PLL circuit 18.

Figure 3:
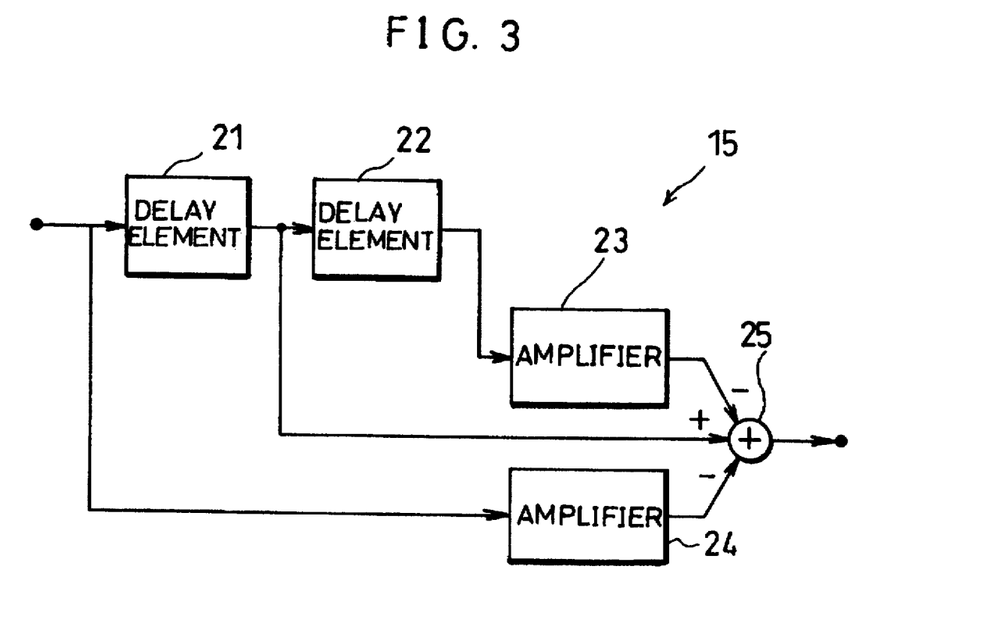
FIG. 3 is a block diagram showing the a circuitry arrangement for the equalizer circuit of the stored signal reproduction circuit in FIG. 1.

Referring now to FIG. 3, equalizer circuit 15 contains a three tap transversal filter consisting of delay elements 21 and 22, amplifiers 23 and 24 and adder 25.

Delay elements 21 and 22 output their input signals with a time delay, $\tau$, and amplifiers 23 and 24 amplify input signals with amplitude factor $\alpha$. Equalizing circuit 15 achieves equalization by delaying, the readback signal by $\pm\tau$ in time, amplifying it by $\alpha$, and subtracting it from the original readback signal. Circuit parameters $\tau$ and $\alpha$ are adjusted based on recording rate and the readback resolution of optical head 5.

In an optical information recording and reproduction device using a ZCAV recording scheme, line recording densities are nearly constant from the disc inner circumference to the disc outer circumference. Therefore, waveform interference in the reproduction signal due to the resolution of the optical head 5 is nearly constant irrespective of the distance from the disc center. On the other hand, the recording frequency changes according to the distance from the disc center. Therefore, the delay parameter, $\tau$, should be adjusted in the equalizer circuit 15 according to the position of the read head (i.e., the recording frequency). That is, the delay amount of the output with respect to input of equalizer circuit 15 changes according to the recording frequency which is dependent on the radial position of the read head with respect to the tracks on the optical disc.

Figure 4:
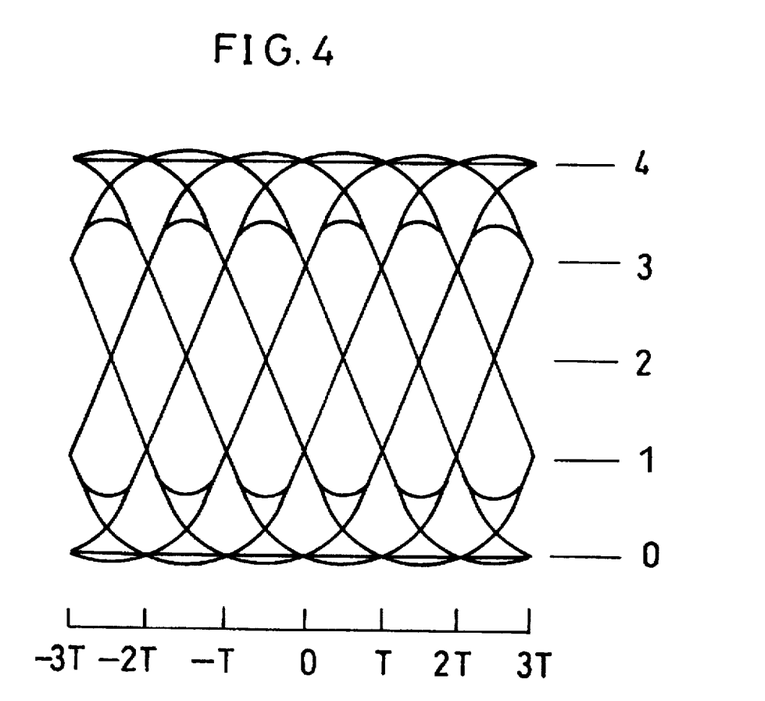
FIG. 4 is a modelled diagram showing the "eye-pattern" of a reproduced signal equalized to PR (1, 2, 1) characteristics by the equalizer circuit of FIG. 3.

Referring to FIG. 4, an eye-pattern of the readback signal, output from equalizer circuit 15, is shown graphically. FIG. 4 illustrates that to equalize the readback signal to PR (1, 2, 1) characteristics necessitates treating isolated bit, such as " . . . 0, 0, 1, 0, 0 . . . ", as representing " . . . 0,0,1,2,1,0,0 . . . " in readback signal amplitudes. When using (1, 7) RLL as conversion method, a minimum magnetization "turn-over" interval of the recording medium magnetization is two channel bits. Therefore, in the case where reading a channel bit pattern "0, 0, 1, 1, 0, 0, 1, 1, 0, 0" where the minimum turn-over interval succeeds, the readback signal amplitudes of each sampling become "1, 1, 3, 3, 1, 1, 3, 3, 1, 1" respectively and the eye-pattern of the readback signal never closes. As apparent from FIG. 4, the eye pattern opens at a position where the signal level corresponds to two, and binary encoding then becomes possible.

Thus, after being equalized to PR (1, 2, 1) characteristics, the readback signal is converted to digital values on every sampling in response to the clocking signals output from PLL circuit 18 at the A/D converter 16. After being converted to a pulse signal by the binary encoder circuit 17 (using the opened eye pattern of PR (1, 2, 1) characteristics), the output signal of equalizer circuit 15 is input to PLL circuit 18 which outputs a clock signal in phase with the readback signal.

With these procedure, the readback signal, equalized to PR (1, 2, 1) characteristics, is supplied to a signal conditioning system, consisting of binary encoder circuit 17 and PLL circuit 18, and A/D converter 16 equally, and thus, a reduction in circuit scale is attained.

Furthermore, in case it becomes necessary to change frequency characteristics of the equalizer in a manner corresponding to recording frequency changes, the operation described above has no effect on the phase relationship between a digitized signal at the A/D converter 16 and a clock signal provided to the A/D converter 16 and the adjustment is necessary only for the phase relationship caused by delayed response in PLL circuit 18. Therefore the adjustment of the phase relationship becomes easier.

Figure 5:
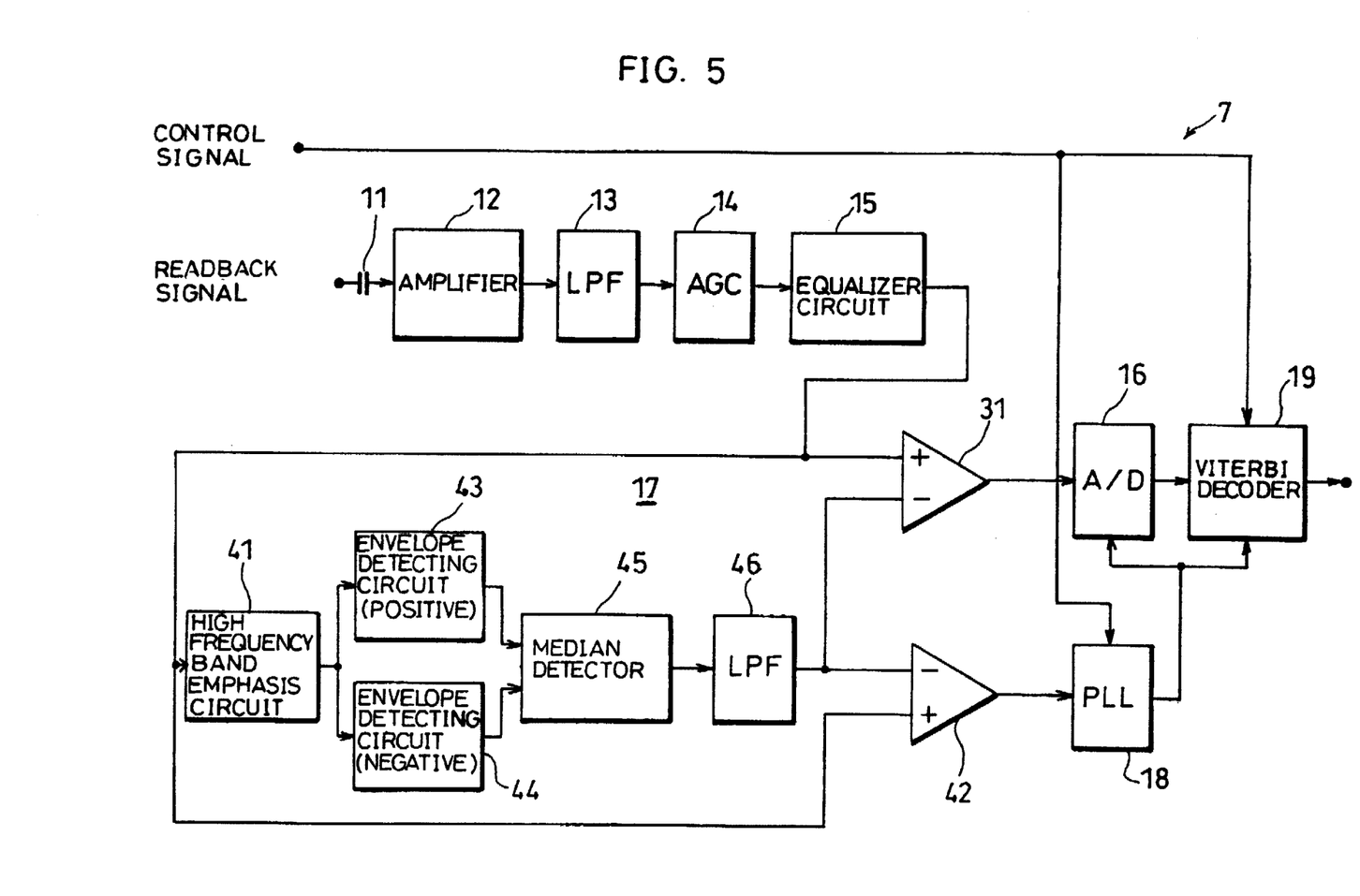
FIG. 5 is a block diagram showing a more detailed circuit arrangement of the signal reproduction circuit of FIG. 1.

As shown in FIG. 5, the output of equalizer circuit 15 is transferred to both a non-reversing input terminal of a subtracter 31 and a high frequency band emphasis circuit 41. The emphasis circuit 41 increases the gain in the high frequency band of a readback signal equalized to PR (1, 2, 1) characteristics.

According to equalization of equalizer circuit 15 to PR (1, 2, 1) waveform characteristics, readback signal is equalized so that it is allowed to contain a predetermined waveform interference. Therefore, as shown in FIG. 4, output peak level of equalizer circuit 15, which readbacks magnetic turn-over of recording midium corresponding to minimum turn-over interval (two channel bits) of RLL conversion scheme, becomes smaller than the output peak level corresponding to other turn-over intervals. That is, frequency-amplitude characteristics of the high frequency band is lowered.

Figure 6:
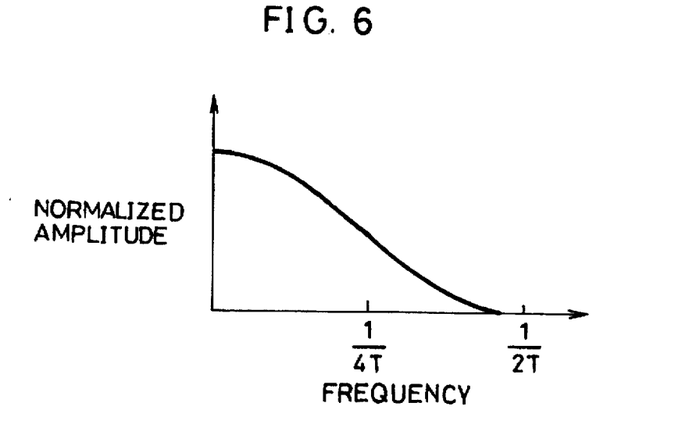
FIG. 6 is a graph showing amplitude-frequency characteristics of transfer function of PR(1, 2, 1) characteristics.

FIG. 6 shows a frequency characteristics of a tranfer function of PR (1, 2, 1) scheme. In FIG. 6, "T" indicates an interval of a channel bit and "¼ T" indicates a repeating frequency of minimun reverse interval in case of decoding by (1, 7) RLL conversion sheme.

Figure 7:
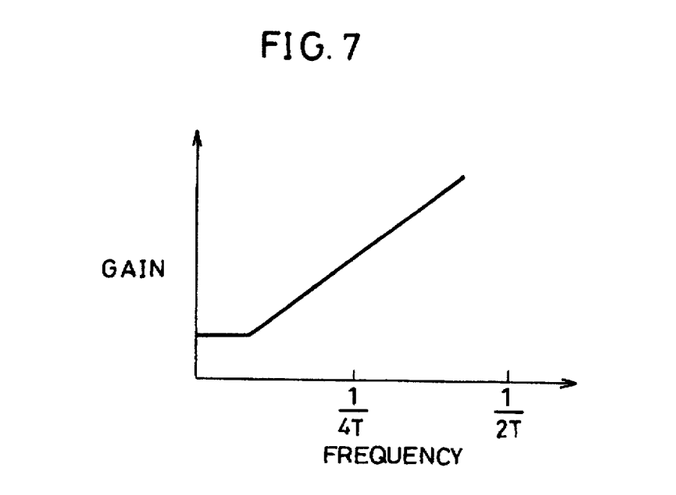
FIG. 7 is a graph showing gain-frequency characteristics of a high frequency band emphasis circuit.

High frequency band emphasis circuit 41 increases the amplitude of the readback signal (high frequency band) corresponding to the minimum "turn-over" (magnetic domain reversal) interval and produces a nearly constant signal envelope (peak value) as evidenced by the frequency vs gain graph of equalizer circuit characteristics shown in FIG. 7. That is, high frequency band emphasis circuit 41 compensates for the lowering in the amplitude-frequency characteristics in high frequency band (as shown in FIG. 6) by increasing the gain around frequency ¼T.

Figure 8:
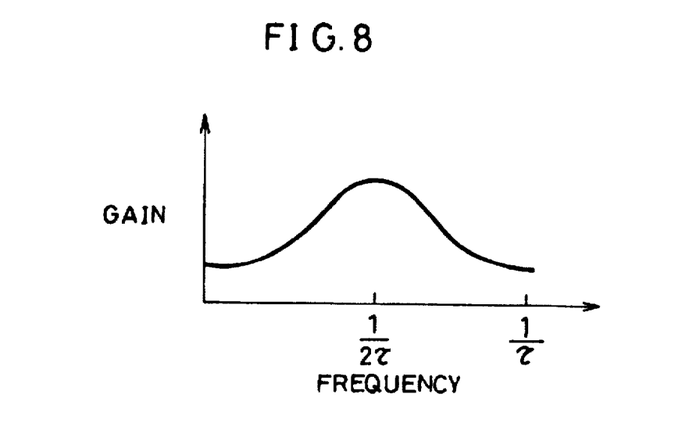
FIG. 8 is a graph showing gain-frequency characteristics of an example equalizer circuit.

In addition, as described below, an output of high frequency band emphasis circuit 41 is also used for providing the threshold value given to a reverse input terminal for comparator 42. Therefore, the circuit delay requirement (i.e., phase delay characteristics) for the high frequency band emphasis circuit 41 is not necessarily as strict as that of equalizer circuit 15. The frequency-gain characteristics of equalizer circuit 15 has a high frequency band emphasis characteristic below the frequency of 1/τ as illustrated by FIG. 8 (this characteristic is similar to that of FIG. 7) and is represented by the following equation:

$$E(j\omega) = (1 - 2\alpha \cos \omega\tau) \exp(-j\omega\tau)$$

where, $\omega = 2\pi f$,

τ: delay amount of the delay elements 21 and 22 described before, and

α: amplitude factor of the amplifier 23 and 24.

But, the equalizer circuit is required to have characteristics not only to compensate for the drop in high frequency band of the readback signal described above, but also to prevent phase distortion in the output after equalization. The type of phase distortion described above can originate from, for instance, a difference in delay amount in the equalizer circuit output depending on mark length concerning readback signal waveforms corresponding to several lengths of mark which are encoded with (1, 7) RLL conversion method. The equalizer circuit 15 makes the above delay amount constant over the whole band and therefore no phase distortion occurs.

On the other hand in case of high frequency band emphasis circuit 41, the phase distortion is not so material provided that the envelope of the reproduction signal is constant.

Figure 9:
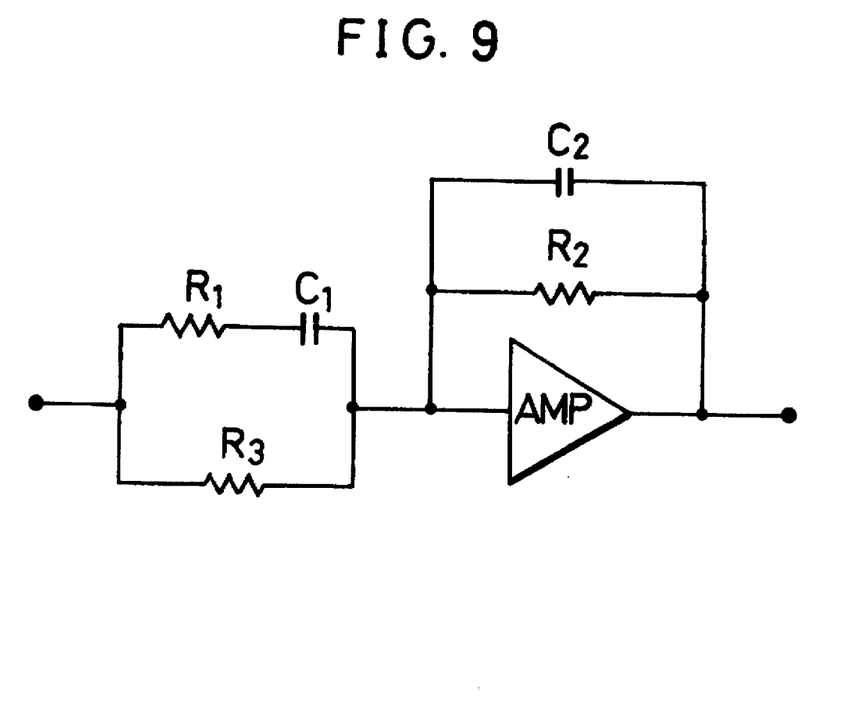
FIG. 9 is a detailed circuit diagram illustrating a high frequency band emphasis circuit arrangement.

As a result, for instance, an high frequency band emphasis circuit 41 shown in FIG. 9 is configured by a simplified equalizer composed of resistors $R_1 \sim R_3$, capacitors $C_1$ and $C_2$ and an amplifier AMP. A frequency characteristic H (jω) of this high frequency band emphasis circuit 41 is shown below.

$$H(j\omega) = \frac{R_2 \cdot \{1 + j\omega C_1(R_1 + R_3)\}}{R_3 \cdot (1 + j\omega C_1 R_1) \cdot (1 + j\omega C_2 R_2)}$$

Figure 10:
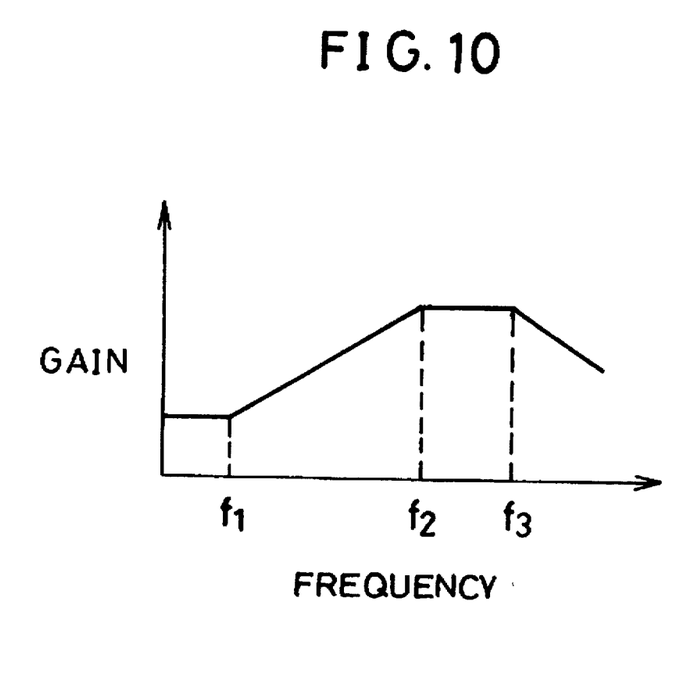
FIG. 10 is a graph showing the gain-frequency characteristics for the high frequency band emphasis circuit of FIG. 9.

Frequency characteristics (gain characteristics) of this high frequency band emphasis circuit 41 is shown in FIG. 10. In FIG. 10, $f_1 = 1/2\pi C_1 (R_1 + R_3)$,
$f_2 = 1/2\pi C_1 R_1$ and
$f_3 = 1/2\pi C_2 R_2$.

According to the above frequency characteristics, high frequency band is emphasized in the region the frequency f is greater than $f_1$ and smaller than $f_2$ (i.e., $f_1 < f < f_2$), and the gain is controlled to be lowered in the region the frequency f is greater than $f_2$ (i.e., $f > f_2$) to restrain an increase of noise component arising from high frequency band emphasis. It can be substituted therefor to prepare a region of $f_2 < f < f_3$ where the gain is constant.

The output signal of high frequency band emphasis circuit 41 is transferred to envelope detecting circuits 43 and 44 so that upper (positive) and lower (negative) envelope limits are respectively detected. Output signals of envelope detecting circuit 43 and 44 are transferred to a median value calculator/detector 45 so that a "median" value at the middle signal level between the two envelope limit detection circuit outputs are obtained. The output signal of median value calculator/detector 45 is supplied to low pass filter 46 so that filtering is carried out to get rid of AC ripple from the output signal. Output signal of low pass filter 46 is transferred to an inverted input terminal of a comparator 42 and not only used as a threshold level for binary encoding of readback signal equalized to PR(1, 2, 1) characteristics outputted from equalizer circuit 15, but also transferred to an inverted input terminal of a subtracter 31. A circuit, which is composed of high frequency band emphasis circuit 41, comparator 42, envelope detecting circuit 43 and 44, median value calculator/detector 45 and low pass filter 46, constitutes a binary encoder circuit 17.

At subtracting circuit 31 as a correcting circuit, a low pass filter 46 output signal is subtracted from equalizer circuit 15 output signal which are input through the non-inverted input terminal. Low pass filter 46 output signal shows almost central point of envelope which is compensated for drop of signal peak level correponding to minimum reverse interval of readback signal from equalizer circuit 15. This signal not only compensates for low frequency band signal lost through a capacitor 11 but also removes remaining noise components in low frequency band which the capacitor 11 can not remove. That is, low frequency offset in equalizer circuit 15 output is cancelled.

Output signal of the subtracter 31 is transferred to A/D converter 16 and quantized based on clock signal generated by the PLL circuit 18 which receives an input from comparator 42 output.

As described above, with this construction, since (1) component in low frequency band of readback signal, which is lost through AC coupling of readback signal, is compensated and (2) low frequency noise components, raised by disc reflection rate fluctuation, which remains after AC coupling, is removed, decoding errors of Viterbi decoder 19 is improved.

[Second embodiment]

Figure 11:
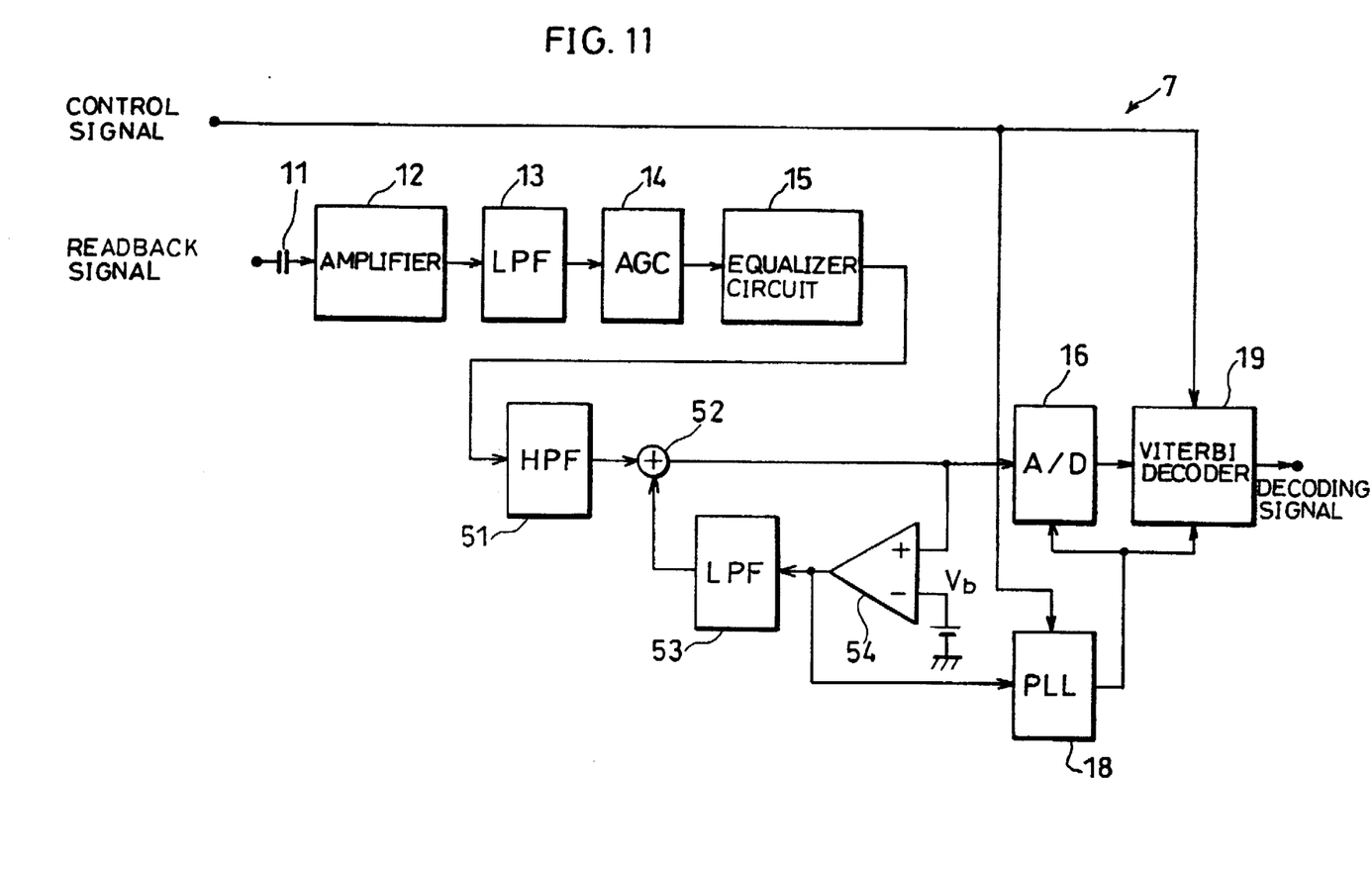
FIG. 11 is a block diagram showing an example reproduction circuit arrangement for a recorded signal reproduction circuit in a magneto-optic disc device in accordance with another embodiment of the present invention.

The following description describes another embodiment of present invention refering to FIG. 11. The elements which have the same functions as those in the above first embodiment have the same numeral numbers and the explanation thereof is omitted.

In the magneto-optic disc device of present invention, as shown in FIG. 11, readback signal equalized to PR (1, 2, 1) characteristics by equalizer circuit 15 is transferred to a high pass filter 51. The high pass filter 51 has a suitable cut off frequency of higher than that derived from time constant of the AC coupling by capacitor 11. So as to remove perfectly such unnecessary low frequency noise components due to reflectional light intensity variation in readback signal (low frequency components from signal from equalizer circuit 15). High pass filter 51 output signal is transferred to an adder 52. At this time, its envelope fluctuates because low frequency components in readback signal together with low frequency noise components are cut off and lacking.

Adder 52 adds signal from high pass filter 51 and signal from a low pass filter 53 and gives the resultant to a comparator 54 at its non-inverted input terminal. Namely, adder 52 adds low frequency components of readback signal, obtained in a manner described below, to the signal from high pass filter 51 which is lacking of low frequency component. Therefore, output signal from adder 52 is compensated for lack of low frequency component and envelope fluctuation is suppressed. Adder 52 output signal is transferred to A/D converter 16.

Comparator 54 compares adder 52 output signal with threshold voltage $V_b$ and converts its output signal to a binary series of pulses. Comparator 54 output signal is tranfered to both PLL 18 circuit and low pass filter 53. Low pass filter 53 has the same cut off frequency as that of high pass filter 51. Therefore, after getting rid of high frequency band by the low pass filter 53, the high frequency band of comparator 54 output signal is cut out to output it to adder 52. Namely, an output signal of low pass filter 53 is equal to a signal component of the readback signal that is removed in the AC coupling and a low frequency band component of the readback signal which is cut off by high pass filter 51. That is, the output signal of the low pass filter 53 is equal to low frequency components of the reproduction signal.

Then, adder 52 output signal is supplied to A/D converter 16 so that sampling treatment based on the clock signal from PLL circuit 18 is carried out and converted to digital values for each sampling.

Thus, with the construction described above, the loss of low frequency band signal components of the readback signal raised by AC coupling of the readback signal is thereby compensated. At the same time, noise component in low frequency band, due to disc reflection rate fluctuation, that still remains after AC coupling, is removed. This resuls in the improvement in decoding error of Viterbi decoder 19.

The output of equalizer circuit 15, which is equalized to PR (1, 2, 1) waveform characteristics, is supplied to a signal conditioning arrangement described below and A/D converter 16. The signal conditioning arrangement is composed of binary encoder circuit 17 and PLL circuit 18 and used for getting the clock signal synchronized with the readback signal. This is similar to readback circuit 7 (see FIG. 1) of the first embodiment.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A recorded signal readback circuit of an optical information reading and recording apparatus, comprising:

an equalizer circuit for equalizing a readback signal from a recording medium to PR (1, 2, 1) characteristics in waveform, said readback signal comprising a channel bit stream of recorded information wherein said information is encoded such that sequential channel bits within the bit stream have a minimum reverse interval of not less than two channel bits;

a binary encoder circuit, said binary encoder circuit converting an output signal of said equalizer circuit into a series of binary pulses, wherein said binary encoder circuit comprises:

a high frequency band emphasis circuit that increases a gain of the output signal of said equalizer circuit at high frequencies, an envelope limit detecting circuit that detects positive and negative envelope limits of an output signal envelope of said high frequency band emphasis circuit, a median value detector circuit that calculates a median value between said positive and negative envelope limits, and a comparator circuit that compares the output signal of said equalizer circuit with the median value;

said readback circuit further comprising a correction circuit for amending the output signal of said equalizer circuit in response to said median value;

a phase-locked-loop (PLL) circuit for outputting a clock signal synchronized in phase with the series of binary pulses;

an A/D converter for digitizing an output signal of said equalizer circuit in response to said clock signal; and a Viterbi decoder, said decoder decoding an output value from said A/D converter using a maximum likelihood decoding approach to reproduce said channel bit stream devoid of undesirable low frequency offset.

2. A recorded signal readback circuit as set forth in claim 1, wherein said correction circuit is a subtracter for subtracting the median value from the output signal of said equalizer circuit.

3. A recorded signal readback circuit as set forth in claim 1, wherein said equalizer circuit includes:

first and second delay elements for successively delaying said readback signal for a same delay time;

first and second amplifiers for respectively amplifying said readback signal and an output signal of said second delay element in accordance with a same amplitude factor; and a subtracter circuit for subtracting two output signals of said respective first and second amplifiers from an output signal of said first delay element.

4. A recorded signal readback circuit as set forth in claim 1, wherein said recording medium is a magneto-optic disc, and said readback signal is read from said magneto-optic disc while rotated at a constant angular velocity.

5. A recorded signal readback circuit as set forth in claim 1, wherein, said data are modulated in accordance with a (1, 7) RLL encoding scheme.

6. A recorded signal readback circuit of an optical information reading and recording apparatus comprising:

an equalizer circuit for equalizing a readback signal from a recording medium to PR (1, 2, 1) characteristics in waveform, said readback signal comprising a channel bit stream of recorded information wherein said information is encoded such that sequential channel bits within the bit stream have a minimum reverse interval of not less than two channel bits;

a high pass filter for cutting off a low frequency band of an output signal of said equalizer circuit;

an adder circuit connected to receive an output of said high pass filter;

a comparator for comparing an output of said adder circuit with a predetermined value so as to output a series of pulses;

a low pass filter connected between an output of said comparator and an input of said adder circuit, said low pass filter providing low frequency signal components of said readback signal to the output of said high pass filter by way of said adder circuit to inhibit envelope fluctuation;

a phase-locked-loop (PLL) circuit for outputting a clocking signal that is synchronized in phase with said series of pulses of said comparator;

an A/D converter for digitizing an output signal of said adder circuit based on said clocking signal; and a Viterbi decoder, said decoder decoding an output value from said A/D converter to reproduce said channel bit stream devoid of undesirable low frequency offset.

7. A recorded signal readback circuit as set forth in claim 6, further comprising:

an input capacitor, said input capacitor provided before the equalizer circuit and providing AC coupling of the readback signal, wherein said high pass filter has a cut-off frequency higher than that determined by a time constant of the AC coupling capacitor; and said low pass filter has an equal cut off frequency identical to that of said high pass filter.

8. A recorded signal readback circuit as set forth in claim 6, wherein, said equalizer circuit includes:

first and second delay elements for successively delaying said readback signal for a same delay time;

first and second amplifiers for respectively amplifying said readback signal and an output signal of said second delay element in accordance with a same amplitude factor; and a subtracter circuit for subtracting two output signals of said respective first and second amplifiers from an output signal of said first delay element.

9. A recorded signal readback circuit as set forth in claim 6, wherein said recording medium is a magneto-optic disc, and said readback signal is read from said magneto-optic disc while rotated at a constant angular velocity.

10. A recorded signal readback circuit as set forth in claim 6, wherein, said data are modulated in accordance with a (1, 7) RLL encoding scheme.

11. A method for canceling undesirable low frequency offset incurred during recovery of distal information recorded on an optical recording medium, comprising the steps of:

(a) equalizing a readback signal comprising a channel bit stream of information obtained from an optical recording medium to PR (1, 2, 1) characteristics in waveform;

(b) producing a series of binary pulses from an equalized signal of step (a) by detecting positive and negative limits of an envelope of said equalized signal, calculating a median value between said positive and negative limits, and comparing the median value to said equalized signal;

(c) applying a correction signal to said equalized signal to correct for low frequency offset, said correction signal based on a median envelope value determined in step (b);

(d) providing a clocking signal that is synchronized in phase with said series of binary pulses produced in step (b);

(e) sampling and converting a corrected equalized signal of step (c) into digitally encoded values at sample times based on said clocking signal; and (f) decoding the digitally encoded signal of step (e) using a Viterbi decoder.

12. The method of claim 11 wherein said correction signal of step (c) is equal to a median envelope value and is subtracted from the equalized signal of step (a).

13. A method for canceling undesirable low frequency offset incurred during recovery of digital information recorded on an optical recording medium, comprising the steps of:

(a) equalizing a readback signal comprising a channel bit stream of information obtained from an optical recording medium to PR (1, 2, 1) characteristics in waveform;

(b) filtering an equalized readback signal of step (a) to eliminate a low frequency band of signals;

(c) producing a series of pulses from a filtered signal of step (b) by comparing said filtered signal to a predetermined reference value;

(d) applying a correction signal to a filtered signal of step (b) to inhibit envelope fluctuation;

(e) providing a clocking signal that is synchronized in phase with said series of pulses produced in step (c);

(f) sampling and converting a corrected filtered signal of step (d) into digitally encoded values at sample times based on said clocking signal; and (g) decoding the digitally encoded signal of step (f) using a Viterbi decoder.

14. The method of claim 13 wherein said correction signal of step (d) is a low frequency band component of said series of pulses of step (c) and is added to said filtered signal of step (b).

* * * * *